| United States Patent [19] | [11] | 4,396,645 |
|---|---|---|
| Kimura et al. | [45] | Aug. 2, 1983 |

[54] COATED OPTICAL GLASS FIBERS AND METHOD FOR PRODUCTION THEREOF

[75] Inventors: Takao Kimura; Nobuo Inagaki, both of Ibaragi; Mitsuo Yoshihara; Fumihiko Kato, both of Osaka, all of Japan

[73] Assignees: Nippon Telegraph and Telephone Public Corporation, Tokyo; Nitto Electric Industrial Co., Ltd., Osaka, both of Japan

[21] Appl. No.: 305,244

[22] Filed: Sep. 24, 1981

[30] Foreign Application Priority Data

Sep. 24, 1980 [JP] Japan ................................ 55-133252

[51] Int. Cl.$^3$ ............................ G02B 5/14; G02B 1/10
[52] U.S. Cl. .................................. 427/163; 350/96.29; 350/96.30; 427/53.1; 427/54.1
[58] Field of Search ..................... 427/163, 53.1, 54.1; 350/96.29, 96.30

[56] References Cited

U.S. PATENT DOCUMENTS 4,125,644 11/1978 Ketley et al. ................... 427/163 X
4,167,305 9/1979 Ichiba et al. ................... 427/163 X

*Primary Examiner*—James R. Hoffman
*Attorney, Agent, or Firm*—Sughrue, Mion, Zinn, Macpeak and Seas

[57] ABSTRACT

Coated optical glass fibers are described, wherein the coating composition comprises an unsaturated polyester containing at least one of (1) polyethylene glycol or polypropylene glycol having an average molecular weight of from 200 to 1,000 as a glycol component, (2) a long chain saturated aliphatic dibasic acid containing 12 or more carbon atoms as saturated polybasic acid component, and an acrylate or methacrylate, and (3) a long chain saturated aliphatic dibasic acid containing 6 or more carbon atoms as a saturated polybasic acid component and a long chain aliphatic dihydric alcohol containing 4 or more carbon atoms as a glycol component; and an acrylate or methacrylate.

20 Claims, No Drawings

COATED OPTICAL GLASS FIBERS AND METHOD FOR PRODUCTION THEREOF

FIELD OF THE INVENTION

The present invention relates to coated light-transmitting optical glass fibers.

BACKGROUND OF THE INVENTION

Optical glass fibers for use in transmitting light (hereinafter referred to as "light-transmitting optical glass fibers" or simply as "optical glass fibers") are brittle, easily flawed or cracked, and have poor flexibility. The formation of such flaws or cracks leads to easy breakdown of the optical glass fibers even when slight external force is applied thereon. Certain resin coatings, therefore, have heretofore been applied to the surface of the optical glass fibers immediately after the production thereof.

Resinous materials which have heretofore been used in the resin coating include epoxy resin and urethane resin. These resinous materials, however, have disadvantages in that productivity when using them is low, since a long period of time is required for curing, the adhesion to glass fibers is insufficient, and the long term reliability is not satisfactory. Furthermore, since the fiber coatings prepared using such resinous materials have poor flexibility, light-transmitting characteristics are deteriorated by microbending.

SUMMARY OF THE INVENTION

The objects of this invention include the provision of coated optical glass fibers in which the coating composition has a low viscosity, shows excellent adhesion properties to optical glass fibers, has a high curing rate, and provides a flexible resin coating. Other objects will be apparent from the description below.

In accordance with the invention, therefore, it has now been found that these objects can be achieved by use of a composition comprising an unsaturated polyester containing at least one of (1) polyethylene glycol or polypropylene glycol having an average molecular weight of from 200 to 1,000 as a glycol component, (2) a long chain aliphatic saturated dibasic acid containing 12 or more carbon atoms as a saturated polybasic acid component, and (3) a long chain aliphatic saturated dibasic acid containing 6 or more carbon atoms as a saturated polybasic acid component and a long chain aliphatic dihydric alcohol containing 4 or more carbon atoms as a glycol component; and acrylate or methacrylate (hereinafter both acrylate and methacrylate are referred generically as "acrylate").

DETAILED DESCRIPTION OF THE INVENTION

The unsaturated polyester as used herein comprises glycol and an unsaturated polybasic acid. In some embodiments, it may also contain a saturated polybasic acid.

In one embodiment of the invention, wherein the unsaturated polyester contains polyethylene glycol or polypropylene glycol having an average molecular weight of from 200 to 1,000 as a glycol component, it is desirable that the polyethylene glycol or polypropylene glycol constitute from 10 to 100 mole %, and preferably from 30 to 100 mole %, of the glycol component. When the proportion of the polyethylene glycol or polypropylene glycol in the glycol component is too low, the resulting composition has a high viscosity and the cured coating film has poor flexibility. In particular, polyethylene glycol having an average molecular weight of from 200 to 800 is preferably used in the invention.

The glycol component may contain glycols other than polyethylene glycol and polypropylene glycol, and there is no limitation to such glycols. Preferred examples of other glycols are long chain glycols containing 4 or more carbon atoms, such as 1,4-butanediol, 1,6-hexanediol and diethylene glycol. Of course, ethylene glycol, propylene glycol, and the like can also be used.

The polybasic acid to be reacted with the foregoing glycol component may be an unsaturated dibasic acid alone. It is preferred, however, that the unsaturated dibasic acid be used in combination with a saturated polybasic acid, especially a saturated dibasic acid. Examples of unsaturated dibasic acids which can be used include maleic acid, fumaric acid, itaconic acid, and citraconic acid. When an unsaturated dibasic acid and a saturated polybasic acid are used in combination as the polybasic acid, the saturated polybasic acid constitutes 90 mole % or less, and preferably from 10 to 80 mole %, of the total polybasic acid. Preferred examples of such saturated polybasic acids are aliphatic dibasic acids containing 6 or more carbon atoms (usually 40 or less carbon atoms) such as adipic acid, sebacic acid, and dodecanedicarboxylic acid. In some cases, all or part of the saturated polybasic acid may be replaced with an aromatic polybasic acid, such as phthalic anhydride, terephthalic acid, trimellitic anhydride, and pyromellitic anhydride, hexahydrophthalic anhydride, or the like.

In another embodiment of the invention, wherein the unsaturated polyester contains a long chain aliphatic saturated dibasic acid containing 12 or more carbon atoms (and usually containing 90 or less carbon atoms), e.g., dodecanedicarboxylic acid, as a saturated polybasic acid component, it is preferred that the long chain apiphatic saturated dibasic acid constitutes from 10 to 90 mole %, and preferably from 30 to 80 mole %, of the total amount of polybasic acids in the unsaturated polyester, i.e., the long chain aliphatic saturated dibasic acid containing 12 or more carbon atoms and the foregoing unsaturated polybasic acid, especially the unsaturated dibasic acid. In this case, 50 mole % or less of the aliphatic saturated dibasic acid containing 12 or more carbon atoms may be replaced with an aliphatic saturated dibasic acid containing 11 or less carbon atoms. The reason for which the amount of the long chain aliphatic saturated dibasic acid is limited to from 10 to 90 mole %, and preferably from 30 to 80 mole %, as described above is that when the amount of the long chain aliphatic saturated dibasic acid being added is too small, the flexibility of the cured coating film is poor, whereas when it is too large, the curing rate of the composition for coating is undesirably small.

Known long chain aliphatic saturated dibasic acids containing 11 or less carbon atoms can be used. The whole or part of the long chain aliphatic saturated dibasic acid may be replaced with an aromatic polybasic acid or alicyclic polybasic acid as described hereinbefore.

In this other embodiment, although there are no particular limitations with respect to the glycol component to be used in the unsaturated polyester, it is preferred that the glycol component be a long chain glycol, such as polyethylene glycol or polypropylene glycol having an average melecular weight of 200 to 1,000, 1,4-butanediol, 1,6-hexanediol, diethylene glycol, and dipropylene glycol. In addition, ethylene glycol, propylene glycol, glycerine, and the like can be used.

In another embodiment of the invention, wherein the unsaturated polyester contains a long chain aliphatic saturated dibasic acid containing 6 or more carbon atoms (usually containing 40 or less carbon atoms) as a saturated polybasic acid component and a long chain aliphatic dihydric alcohol containing 4 or more carbon atoms (usually containing 70 or less carbon atoms) as a glycol component, the aliphatic saturated dibasic acid constitutes from 10 to 90 mole %, and preferably from 20 to 80 mole %, of the saturated and unsaturated polybasic acid component and the aliphatic dihydric alcohol constitutes from 10 to 100 mole %, and preferably from 20 to 100 mole %, of the glycol component. The reasons for which the aliphatic saturated dibasic acid and aliphatic dihydric alcohol are limited to the foregoing ranges are to obtain good flexibility of the coating and to avoid unduly long curing times.

Examples of long chain aliphatic saturated dibasic acids containing 6 or more carbon atoms which can be used include adipic acid, sebacic acid, and dodecanedicarboxylic acid. Examples of long chain aliphatic dihydric alcohols containing 4 or more carbon atoms which can be used include 1,4-butanediol, 1,5-pentanediol, and 1,6-hexane-diol.

In this case, 50 mole % or less of the long chain aliphatic saturated dibasic acid containing 6 or more carbon atoms may be replaced with an aliphatic saturated dibasic acid containing 5 or less carbon atoms. Furthermore, all or part of the aliphatic saturated dibasic acid containing 5 or less carbon atoms may be replaced with an aromatic or alicyclic polybasic acid such as phthalic anhydride, isophthalic acid, terephthalic acid, trimellitic anhydride, and hexahydrophthalic anhydride.

Glycols which can be used in combination with the foregoing aliphatic dihydric alcohol and containing 4 or more carbon atoms include polyethylene glycol having an average molecular weight of from 200 to 1,000, polypropylene glycol having an average molecular weight of from 200 to 1,000, ethylene glycol, diethylene glycol, propylene glycol, dipropylene glycol, glycerine, and trimethylene glycol.

Unsaturated polybasic acids which can typically be used for the production of the unsaturated polyester in the invention are, as described hereinbefore, maleic anhydride, fumaric acid, itaconic acid, and citraconic acid.

The unsaturated polyester as used herein is produced preferably by reacting a glycol and a polybasic acid under a conditions such that the hydroxyl group and carboxyl group are equimolar or nearly equimolar according to the usual procedure as described in, for example, Johan Bjorksten et al, POLYESTERS AND THEIR APPLICATIONS, PP 35–43, 1956, Reinhold Publishing Corp. The molecular weight of the unsaturated polyester is suitably from about 500 to 10,000.

The composition of the invention comprises the unsaturated polyester and acrylate. There are no special limitations with respect to the acrylate which is used as a cross-linking agent for the unsaturated polyester. Examples of such acrylates include 2-ethylhexyl acrylate or methacrylate, 1,6-hexanediol diacrylate or dimethacrylate, trimethylolpropane triacrylate or trimethacrylate, pentaerythritol tetraacrylate or tetramethacrylate, diethylene glycol diacrylate or dimethacrylate, and polyethylene glycol diacrylate or dimethacrylate. Of these compounds, diacrylates or dimethacrylates are preferred.

Although the ratio of the acrylate to the unsaturated polyester is determined so that the resulting composition has the optimum viscosity and curing rate, and the cured coating film has the optimum flexibility, the composition of the invention usually comprises from 30 to 90 parts by weight of the unsaturated polyester and from 70 to 10 parts by weight of the acrylate, per 100 parts total weight, and preferably from 50 to 80 parts by weight of the unsaturated polyester and from 50 to 20 parts by weight of the acrylate, per 100 parts total weight.

The composition of the invention is cured with a radical-polymerization initiator or photo-polymerization initiator. For this curing, initiators heretofore known can be used. Suitable examples of such radical polymerization initiators include benzoyl peroxide and t-butyl perbenzoate. Suitable examples of photo-polymerization initiators include acetophenone and benzophenone. The amount of the initiator being added is usually from 0.1 to 10% by weight based on the total weight of the composition.

The composition for coating optical glass fibers of the invention may further contain modification resins and various additives, if desired. Furthermore, if necessary, the composition may be diluted with a solvent. The modification resin is used in an amount equal to or less than the unsaturated polyester, preferably in an amount of ¼ or less of the unsaturated polyester. Modification resins which can be used include an epoxy resin, polyamide, polyurethane, polyether, polyamideimide, a silicone resin, and a phenol resin. Additives which can be used include curding-accelerators, e.g., cobalt naphthenate, zinc naphthenate, and dimethylaniline, organic silicone compounds, and surface active agents.

The optical glass fiber-coating composition of the invention is, as described above, a liquid composition comprising an unsaturated polyester containing a long chain glycol and/or a long chain dibasic acid as a glycol component and/or a saturated polybasic acid component, and acrylate, which, as illustrated in the examples as described hereinafter, not only has a very low viscosity compared with the conventional composition, for example, a composition comprising an epoxy resin, a high curing rate, and increases the productivity of optical glass fibers, but also provides a flexible coating film and increases the strength and reliability of optical glass fibers.

The invention is described in detail by reference to the following examples although it is not limited thereto All parts are by weight.

(A) Preparation of Coating Compositions

EXAMPLE 1

A 1-liter four-necked flask equipped with a stirrer, a thermometer, and a reflux condenser was charged with 98 g (1.0 mole) of maleic anhydride and 600 g (1.0 mole) of polyethylene glycol having an average molecular weight of 600 which were then reacted at a temperature of 150° to 200° C. for 4 hours to prepare an unsaturated polyester having an acid value of 30. In 80 parts of the unsaturated polyester thus prepared were dissolved 20 parts of trimethylolpropane triacrylate and 1 part of t-butyl perbenzoate to prepare Coating Composition A.

The characteristics of Coating Composition A are shown in Table 1.

EXAMPLE 2

To a flask as used in Example 1 were charged 49 g (0.5 mole) of maleic anhydride, 73 g (0.5 mole) of adipic acid, and 400 g (1.0 mole) of polyethylene glycol having an average molecular weight of 400 which were then reacted at a temperature of 160° to 210° C. for 5 hours to prepare an unsaturated polyester having an acid value of 20. In 70 parts of the unsaturated polyester thus prepared were dissolved 30 parts of 2-ethylhexyl acrylate and 1 part of t-butyl perbenzoate to prepare Coating Composition B. The characteristics of Coating Composition B are shown in Table 1.

EXAMPLE 3

To a flask as used in Example 1 were charged 29.4 g (0.3 mole) of maleic anhydride, 239.4 g (0.7 mole) of a long chain aliphatic dibasic acid containing 20 carbon atoms (SB-20 produced by Okamura Oil Co., Ltd.) and 62 g (1.0 mole) of ethylene glycol where were then reacted at a temperature of 180° to 210° C. for 5 hours to prepare an unsaturated polyester having an acid value of 25. In 60 parts of the unsaturated polyester thus prepared was dissolved 40 parts of trimethylolpropane triacrylate. In addition, 5 parts of benzoin isopropyl ether was added thereto as a photo-polymerization initiator to prepare Coating Composition C. The characteristics of Coating Composition C are shown in Table 1.

EXAMPLE 4

To a flask as used in Example 1 were charged 49 g (0.5 mole) of maleic anhydride, 115 g (0.5 mole) of dodecanedicarboxylic acid, and 118 g (1.0 mole) of 1,6-hexanediol where were then reacted at a temperature of 150° to 200° C. for 7 hours to prepare an unsaturated polyester having an acid value of 18. In 60 parts of the unsaturated polyester thus prepared were dissolved 40 parts of polyethylene glycol diacrylate having an average molecular weight of 400 and 1 part of t-butyl perbenzoate to prepare Coating Composition D. The characteristics of Coating Composition D are shown in Table 1.

EXAMPLE 5

To a flask as used in Example 1 were charged 49 g (0.5 mole) of maleic anhydride, 73 g (0.5 mole) of adipic acid, and 425 g (1.0 mole) of polypropylene glycol having an average molecular weight of 425 which were then reacted at a temperature of 180° to 215° C. for 6 hours to prepare an unsaturated polyester having an acid value of 27. In 70 parts of the unsaturated polyester thus prepared were dissolved 30 parts of 2-ethylhexyl methacrylate and 2 parts of benzoyl peroxide containing 50% of dioctyl phthalate to prepare Coating Composition E. The characteristics of Coating Composition E are shown in Table 1.

COMPARATIVE EXAMPLE 1

In 100 parts of an epoxy resin, Epon-828 (produced by Shell Chemical Co., Ltd.) was dissolved 5 parts of 2-ethyl-4-methylimidazole to prepare Coating Composition R. The characteristics of Coating Composition R are shown in Table 1.

TABLE 1

| | Coating Composition | | | | | |
|---|---|---|---|---|---|---|
| | A | B | C | D | E | R |
| Viscosity (cps/25° C.) | 5400 | 3300 | 2300 | 2500 | 3500 | 15000 |
| Gellation Time (seconds/150° C.) | 7 | 23 | — | 15 | 21 | 59 |
| Hardness (Shore A) | 45 | 25 | 55 | 40 | 30 | more than 100 |

In Table 1, the Shore hardness A was measured as follows:

In the case of Coating Compositions A, B, D, E and R, each composition was cured by heating at 150° C. for 15 minutes to produce a 2 mm thick plate. With the thus produced plate, the Shore hardness was measured.

In the case of Coating Composition C, the composition was cured by irradiating with light at a position of 15 cm below a light source of two high pressure mercury lamps (input: 120 W/cm; lamp output: 5 kw) placed in parallel to each other at a conveyor speed of 50 m/minute to produce a 100 μm thick sheet. With the thus produced sheet, the Shore hardness was measured.

(B) Coating of Optical Glass Fibers

EXAMPLE 6

On the surface of optical glass fibers having a diameter of 125 μm which had been prepared by drawing at a rate of 30 m/minute was coated Coating Composition C prepared in Example 3 at a step subsequent to the drawing step. The Coating Composition C was then cured by irradiating with ultraviolet rays by the use of two lamps having an output of 2 kw. The outer diameter of the optical glass fiber coated with the composition was about 250 μm and the surface was uniform. The tensile strength was 5.9 kg (an average value as determined using 20 samples having a length of 10 m), and no increase in transmission loss was observed even at −40° C.

EXAMPLE 7

On the surface of optical glass fibers having a diameter of 125 μm which had been prepared by drawing at a rate of 20 m/minute was coated Coating Composition A prepared in Example 1 at a step subsequent to the drawing step. The Coating Composition A was then cured by the use of an electric furnace (length: 1 m) maintained at 450° C. The outer diameter of the optical glass fiber coated with the composition was about 230 μm, and the surface was uniform. The tensile strength of the optical glass fiber thus produced was 6.1 kg (an average value as determined using 20 samples having a length of 10 m), and no increase in the transmission loss was observed even at −40° C.

COMPARATIVE EXAMPLE 2

In Example 7, Coating Composition R prepared in Comparative Example 1 was used in place of Coating Composition A and cured in an electric furnace maintained at 650° C. to produce optical glass fibers. The outer diameter of the optical glass fiber thus coated was 150 to 310 μm. Furthermore, with the thus produced optical glass fiber, an abrupt increase in transmission loss was observed at −20° C. or less.

EXAMPLE 8-10

Using the Coating Compositions B, D and E obtained in Examples 2, 4 and 5, respectively, coated optical glass fibers were prepared in the same procedures as in Example 7 under the conditions shown in Table 2 below.

The characteristics of each of the coated optical glass fibers obtained are shown in Table 2 below.

TABLE 2

| | Optical Glass Fiber | | | Electric Furnace | | Coated Optical Glass Fiber | | | |
|---|---|---|---|---|---|---|---|---|---|
| Example No. | Drawing Speed (m/min.) | Diameter (μm) | Coating Composition | Temp. (°C.) | Length (m) | Diameter (μm) | Appearance | Tensile Strength* (Kg) | Transmission Loss |
| 8 | 20 | 125 | B | 550 | 1 | 220 | Uniform | 6.2 | No increase even at −40° C. |
| 9 | 30 | 125 | D | 500 | 1 | 210 | Uniform | 6.1 | No increase even at −40° C. |
| 10 | 30 | 125 | E | 520 | 1 | 225 | Uniform | 6.2 | No increase even at −40° C. |

*Same conditions as defined in Example 7.

While the invention has been described in detail and with reference to specific embodiments thereof, it will be apparent to one skilled in the art that various changes and modifications can be made therein without departing from the spirit and scope thereof.

What is claimed is:

1. An optical glass fiber coated with a cured polymeric layer formed from a composition comprising an unsaturated polyester comprising glycol and unsaturated polybasic acid components, including at least one of (1) polyethylene glycol or polypropylene glycol having average molecular weight of from 200 to 1,000 as a glycol component, (2) a long chain aliphatic saturated dibasic acid containing 12 or more carbon atoms as a saturated polybasic acid component, and (3) a long chain aliphatic saturated dibasic acid containing 6 or more carbon atoms as a saturated polybasic acid component and a long chain aliphatic dihydric alcohol containing 4 or more carbon atoms as a glycol component; and acrylate or methacrylate.

2. An optical glass fiber as in claim 1 coated with a composition comprising an unsaturated polyester containing polyethylene glycol or polypropylene glycol having an average molecular weight of from 200 to 1,000 as a glycol component and an acrylate or methacrylate.

3. An optical glass fiber coated with a composition as in claim 2, wherein the polyethylene glycol or polypropylene glycol constitutes from 10 to 100 mole % of the glycol component.

4. An optical glass fiber coated with a composition as in claim 2 or 3, comprising from 30 to 90 parts by weight of the unsaturated polyester and from 70 to 10 parts by weight of the acrylate or methacrylate, per 100 parts total weight.

5. An optical glass fiber as in claim 1 coated with a composition comprising an unsaturated polyester containing a long chain saturated aliphatic dibasic acid containing 12 or more carbon atoms as a saturated polybasic acid component, and an acrylate or methacrylate.

6. An optical glass fiber-coated with a composition as in claim 5, wherein the long chain saturated aliphatic dibasic acid constitutes from 10 to 90 mole % of the saturated and unsaturated polybasic acid components.

7. An optical glass fiber coated with a composition as in claim 5 or 6, comprising from 30 to 90 parts by weight of unsaturated polyester and from 70 to 10 parts by weight of the acrylate or methacrylate, per 100 parts total weight.

8. An optical glass fiber as in claim 1 coated with a composition comprising an unsaturated polyester containing a long chain saturated aliphatic dibasic acid containing 6 or more carbon atoms as a saturated polybasic acid component and a long chain aliphatic dihydric alcohol containing 4 or more carbon atoms as a glycol component, and an acrylate or methacrylate.

9. An optical glass fiber coated with a composition as claimed in claim 8, wherein the long chain saturated dibasic acid constitutes from 10 to 90 mole % of the saturated and unsaturated polybasic components and the long chain aliphatic dihydric alcohol constitutes from 10 to 100 mole % of the glycol components.

10. An optical glass fiber coated with a composition as in claim 8 or 9, comprising from 30 to 90 parts by weight of the unsaturated polyester and from 70 to 10 parts by weight of the acrylate or methacrylate, per 100 parts total weight.

11. A method of forming a coated optical glass fiber wherein:
an uncoated glass fiber is coated with a composition comprising an unsaturated polyester comprising glycol and unsaturated polybasic acid components, including at least one of (1) polyethylene glycol or polypropylene glycol having average molecular weight of from 20 to 1,000 as a glycol component, (2) a long chain aliphatic saturated dibasic acid containing 12 or more carbon atoms as a saturated polybasic acid component, and (3) a long chain aliphatic saturated dibasic acid containing 6 or more carbon atoms as a saturated polybasic acid component and a long chain aliphatic dihydric alcohol containing 4 or more carbon atoms as a glycol component; and acrylate or methacrylate; and
said composition is cured.

12. A method for forming a coated glass fiber as in claim 11, wherein said composition comprises an unsaturated polyester containing polyethylene glycol or polypropylene glycol having an average molecular weight of from 200 to 1,000 as a glycol component and an acrylate or methacrylate.

13. A method for forming a coated glass fiber as in claim 12, wherein the polyethylene glycol or polypropylene glycol constitutes from 10 to 100 mole % of the glycol component.

14. A method for forming a coated glass fiber as in claim 12 or 13, wherein said composition comprises from 30 to 90 parts by weight of the unsaturated polyester and from 70 to 10 parts by weight of the acrylate or methacrylate, per 100 parts total weight.

15. A method for forming a coated glass fiber as in claim 11, wherein said composition comprises an unsaturated polyester containing a long chain saturated aliphatic dibasic acid containing 12 or more carbon atoms as a saturated polybasic acid component, and an acrylate or methacrylate.

16. A method for forming a coated glass fiber as in claim 15, wherein the long chain saturated aliphatic dibasic acid constitutes from 10 to 90 mole % of the saturated and unsaturated polybasic acid components.

17. A method for forming a coated glass fiber as in claim 15 or 16, wherein said composition comprises from 30 to 90 parts by weight of unsaturated polyester and from 70 to 10 parts by weight of the acrylate or methacrylate, per 100 parts total weight.

18. A method for forming a coated glass fiber as in claim 11, wherein said composition comprises an unsaturated polyester containing a long chain saturated aliphatic dibasic acid containing 6 or more carbon atoms as a saturated polybasic acid component and a long chain aliphatic dihydric alcohol containing 4 or more carbon atoms as a glycol component.

19. A method for forming a coated glass fiber as in claim 18, wherein the long chain saturated dibasic acid constitutes from 10 to 90 mole % of the saturated and unsaturated polybasic components and the long chain aliphatic dihydric alcohol constitutes from 10 to 100 mole % of the glycol component.

20. A method for forming a coated glass fiber as in claim 18 or 19, wherein said composition comprises from 30 to 90 parts by weight of the unsaturated polyester and from 70 to 10 parts by weight of the acrylate or methacrylate, per 100 parts total weight.

* * * * *